Sept. 4, 1945.　　　　　C. V. SMITH　　　　　2,384,202
PRESSURE CONTROL VALVE
Original Filed Feb. 24, 1941　　2 Sheets-Sheet 1

Inventor
CHARLES V. SMITH,
By Toulmin & Toulmin
Attorney

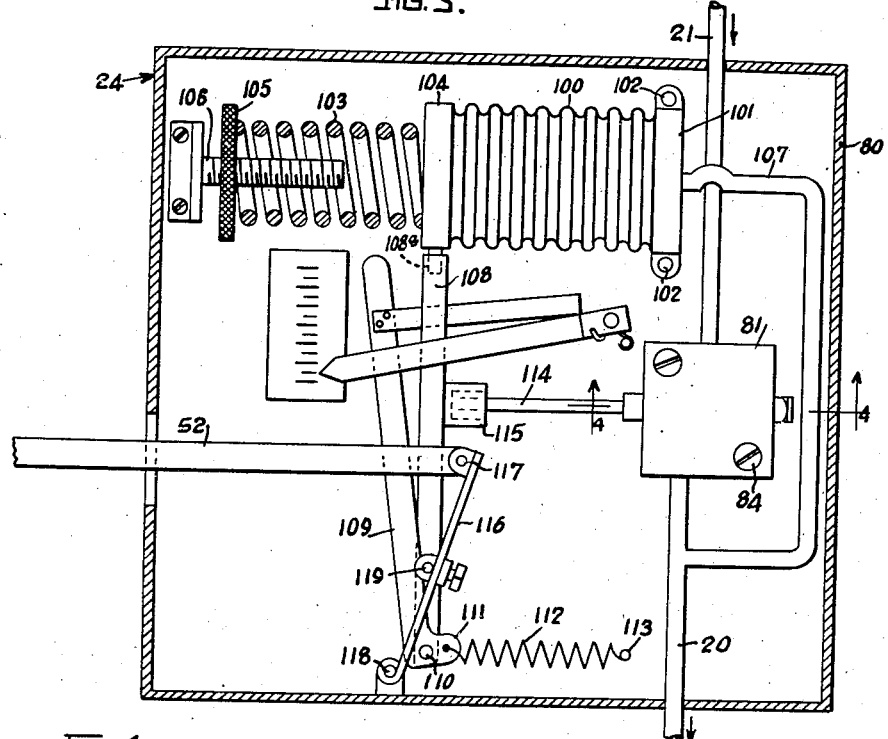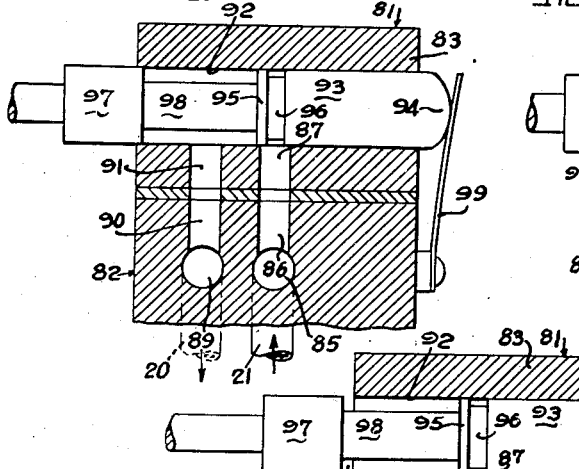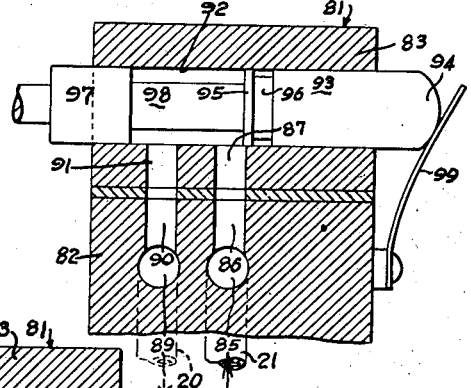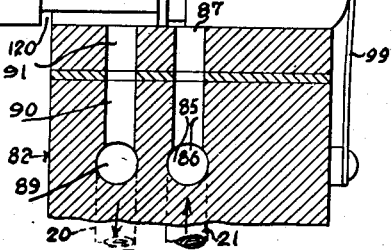

Patented Sept. 4, 1945

2,384,202

UNITED STATES PATENT OFFICE 2,384,202

PRESSURE CONTROL VALVE

Charles V. Smith, Dayton, Ohio, assignor to The Univis Lens Company, Dayton, Ohio, a corporation of Ohio Original application February 24, 1941, Serial No. 380,149. Divided and this application October 1, 1941, Serial No. 413,189

8 Claims. (Cl. 50—10)

This invention relates to an apparatus for controlling the operation of a forming press for shaping a mass of synthetic resin, and more particularly, relates to a pressure control for accurately controlling the supply of a pressure fluid to the forming press.

When producing optical articles from a solidified mass of plastic material, it is necessary that the original properties of the material be retained. There are certain synthetic plastic materials, such as Plexiglas, Lucite, Crystallite and others, which are organic resins produced by the polymerization of the monomeric derivatives of acrylic and methacrylic acids, which are acceptable for use in forming optical articles such as lenses, and more particularly ophthalmic lenses.

In order to produce high grade optical articles from synthetic plastic materials it is necessary that the various steps in forming or shaping the article by the pressing method shall be accomplished under accurate control. It is also required that the pressing or deforming of a blank or mass of plastic material shall not be carried out at too great a rate of deformation. If a mass of resinous material is formed into a lens, and the forming is carried out at too rapid a rate, there is an internal disorder which produces an internal stress which alters the index of refraction of the material thereby displacing the optical paths through the same. These strains can be termed "optical strains" since they are of insufficient value to cause any mechanical difficulty in the material and are imperceptible to the eye. They are only noticeable when the material is used as a lens, the optical path displacement showing up very definitely under such conditions.

It is therefore an object of this invention to provide a pressure regulating device for accurately controlling the flow of fluid pressure to the press for operating the same.

It is another object of the invention to provide a pressure regulating apparatus having a mechanical actuator which is associated with a compound lever system which reduces the effective movement of the mechanical actuator in a manner that a valve mechanism controlled thereby is provided with a relatively small movement in comparison to the movement of the mechanical actuator.

It is another object of the invention to provide a pressure regulating valve for accurately controlling an increasing pressure which is supplied to a pressure operated mechanism, such as a press.

It is another object of the invention to provide a pressure controlling device which will accurately establish and hold pressure once established, the valve permitting an increase of the pressure supplied therethrough and constructed and arranged for holding the new pressure established.

It is another object of the invention to provide a pressure regulating valve for accurately controlling the supply of fluid pressure to a pressure actuated device wherein the controlling mechanism will either supply fluid to the device or exhaust fluid therefrom to permit a balance of pressure against a resilient pressure determining device, thereby establishing an accurately controlled pressure in the fluid pressure actuated mechanism.

It is another object of the invention to provide a pressure regulating valve for accurately actuating the platens of a press and for controlling the pressure applied thereby upon an article formed between the platens.

It is another object of the invention to provide a time controlled pressure control regulating mechanism for accurately controlling the pressure applied to the pressure mechanism of a forming press.

Further objects and advantages will be apparent from the drawings and the following description.

This application is a division of my copending application, Serial No. 380,149, filed February 24, 1941.

In the drawings:

Figure 3 is a cross-sectional view of a somewhat diagrammatic showing of a pressure regulating valve for controlling pressure applied to the forming press.

Figure 4 is a cross-sectional view taken along line 4—4 of Figure 3 showing the control valve of the pressure regulating device in the closed position.

Figure 5 is a similar view of the valve of Figure 4 but arranged in the open position.

Figure 6 is a view similar to Figure 4, but showing the valve in the position for bleeding pressure from the pressure operating mechanism of the press.

Figure 1:
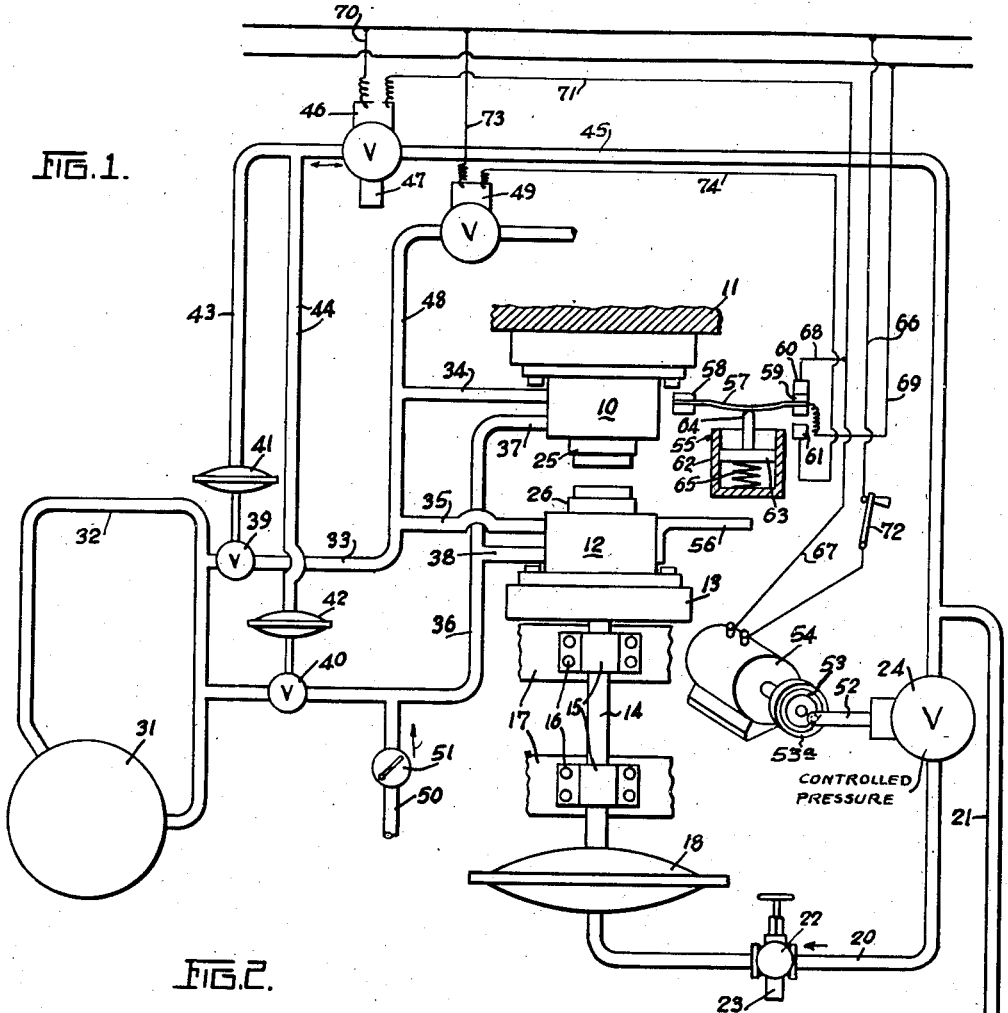
Figure 1 is a diagrammatic view of a press and operating system associated therewith for performing the operation of this invention.

In the manufacture of ophthalmic lenses, or any other lens which is to be a true optical article, it is essential that the original optical characteristics of the resin from which the article is manufactured shall be retained. One of the most difficult operations in the manufacture of lenses is the control of the index of refraction of the resin. The sheet of resin from which the optical article is produced has a determined index of refraction which is accurately controlled during the manufacture of the sheet.

This applicant has found that when a sheet of resin is altered in its configuration that unless the rate of movement of the sheet is controlled during the forming thereof that the original index of refraction is altered, and that this alteration is not uniform throughout the mass of the article, thereby resulting in a bi-refringent optical article.

The resin is formed between suitable die surfaces which are moved toward one another by a suitable forming press. The rate of movement of the die surfaces thus controls the rate of movement of the resin. Therefore, it is essential that the fluid flow to the press for actuating the same shall be accurately controlled at a predetermined rate and the pressure shall be accurately governed to prevent any undue increase of pressure during the forming process.

The pressure regulating valve of this invention is constructed and arranged in a manner that a very fine and accurate control over the pressure in the fluid conduit to the press is obtained. The valve is adapted to either supply fluid to the press or to permit fluid to discharge from the press to establish an accurate pressure therein which is controlled by means of a balancing spring. The forming press and system associated therewith disclosed in this application is particularly adapted to the manufacture of plastic lenses.

The forming press consists of a platen 10 carried upon a stationary head 11, and a platen 12, carried upon a movable head 13, which head 13 is carried by a pillar 14. The pillar 14 is journaled in the bearings 15 which are secured by means of the bolts 16 to the stationary support 17. The head 13 is carried upon the upper end of the pillar 14 while the lower end thereof is connected to a diaphragm motor 18. The diaphragm motor 18 is connected to a source of fluid pressure, such as the fluid reservoir 19, by means of the conduits 20 and 21. A manually controlled 3-way valve 22 is positioned in the conduit 20 for controlling the flow of fluid pressure from the fluid storage tank 19 to the diaphragm motor 18. The valve 22 can be operated to permit the flow of fluid pressure to the motor 18, or can exhaust the pressure from the motor 18 by way of the exhaust conduit 23.

A fluid pressure regulating or control valve 24 is positioned in the conduit 20 and is located between the fluid pressure storage tank 19 and the hand operated valve 22. This pressure control valve 24 is operated to gradually increase the pressure upon the diaphragm motor 18 for expanding the same and thus to close the platens 10 and 12, thus closing the die halves 25 and 26.

The press just described is a simple form of press mechanism since the pressures involved, when producing lenses from resinous material, are not high. The diaphragm motor 18 is well suited for applying sufficient pressure between the die halves 25 and 26 for accomplishing the desired forming of a blank of resinous material placed therebetween.

Figure 2:
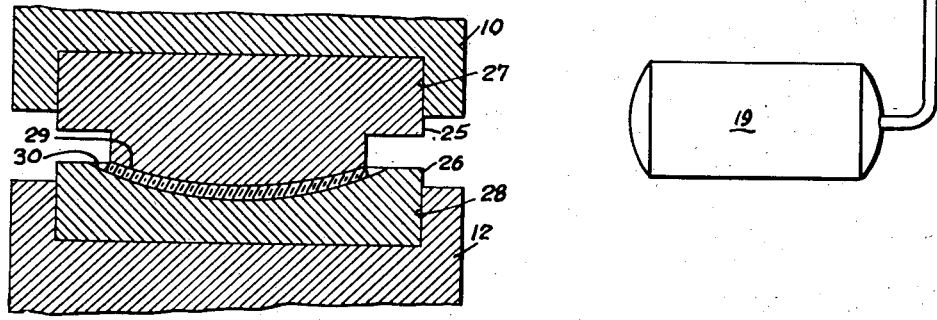
Figure 2 is a cross-sectional view of a pair of forming dies adapted to be associated with the forming press for producing a lens.

The die halves 25 and 26 are carried by the platens 10 and 12 in any suitable manner but, as shown in Figure 2, the die halves can be carried within the recesses 27 and 28 provided in the platens 10 and 12 respectively. Suitable means can be provided for removably positioning the die halves 25 and 26 in the recesses 27 and 28 respectively, to permit removal and insertion of various cooperating pairs of die elements. As shown in Figure 2, the die halves 25 and 26 are provided with cooperating die surfaces 29 and 30 respectively which are of the desired surface curvature for producing a lens from a mass of resinous material positioned therebetween, the surfaces being arranged to cooperate with one another to produce a lens having the desired surface curvature. The surfaces 29 and 30 of the die halves 25 and 26 are finished to the desired perfection which will impart a surface finish upon the mass of resinous material suitable for optical use.

The platens 10 and 12 are provided with passages suitable for the circulation of a heating or a cooling fluid therethrough. To provide a source of fluid heat for circulation through the passages in the platens 10 and 12 a steam boiler 31 is provided. This boiler can be heated by any suitable source of heat for maintaining the steam loop 32 filled with live steam. It is of course to be understood that the steam boiler 31 represents any source of fluid heat which can be arranged for circulation through the passages provided in the platens 10 and 12.

A conduit 33 connects the upper portion of the steam loop 32 with the inlet conduits 34 and 35 connected to the platens 10 and 12 respectively. A steam return conduit 36 is connected to the platens 10 and 12 respectively by means of the conduits 37 and 38. The conduit 36 connects with the lower portion of the steam loop 32 for return of condensed steam to the steam boiler 31. While the present description refers to steam as the heating fluid for circulation through the platens of the press, it can readily be understood that any other fluid can be used for circulation through the platens for heating the same to any desired temperature. The steam loop 32 provides means whereby steam at a constant temperature is available for circulation through the conduits 33, 34 and 35, and will be of a more even temperature than if the conduit connecting the steam source with the conducting conduits 33, 34 and 35 would be a dead end conduit.

To control the circulation of the steam through the conduits 33 and 36 shut-off valves 39 and 40 respectively are placed in the conduits. These fluid flow control valves 39 and 40 are operated by means of the diaphragm motors 41 and 42 respectively. The motors 41 and 42 are connected by means of the conduits 43 and 44 respectively to the conduit 45, which latter conduit is connected with the conduit 21 leading from the fluid pressure source 19. A 3-way solenoid valve is positioned in the conduit 45 between the pressure source 19 and the diaphragm motors 41 and 42. The solenoid valve 46 when energized is adapted to open to permit fluid pressure to pass from the conduit 45 into the conduits 43 and 44 for operating the diaphragm motors 41 and 42. When the solenoid valve 46 is deenergized the conduit 45 is closed while the valve 46 connects the conduits 43 and 44 with an exhaust conduit 47.

An exhaust conduit 48 is connected to the conduit 33 and in which there is positioned a fluid flow control valve 49, which valve is normally closed when deenergized. The valve 49 provides means for exhausting pressure from the conduits 33, 34, 35 and 36 during a certain portion of the cycle of operation of the forming press, which will be hereinafter described.

During a certain portion of the cycle of operation of the forming press a cooling fluid is circulated through passages in the platens 10 and 12. The heating and cooling passages in the platens may be independent passages or can be a common set of passages. As disclosed in Figure 1, both the heating and cooling medium circulates through the same set of passages. A conduit 50 connects the conduit 36 with a source of cooling fluid which is under pressure. A unidirectional flow check valve 51 is positioned in the conduit 50 and controls the flow of cooling fluid into the conduit 36. The check valve 51 is adapted to open for the passage of fluid in the direction of the arrow indicated adjacent the conduit 50, the check valve closing against return flow of fluid.

The check valve 51 is adapted to be closed by the pressure of the heating fluid when heating fluid under pressure is present in the conduit 36, the pressure of the heating fluid overcoming the pressure of the cooling fluid to close the check valve 51 and thus prevent circulation of cooling fluid through the conduit 36 as long as heating fluid is present therein and is under pressure.

To control the rate at which the pressure will be increased within the diaphragm motor 18, for moving the die half 26 against the die half 25, the valve or pressure regulator 24 is gradually opened to permit increasing pressure to pass therethrough into the conduit 20. The pressure regulating valve 24 is provided with an actuating arm 52 which engages a cam track 53 provided in a disk 53a mounted on the shaft of a timing motor 54. The shape of the cam track 53 is pre-designed to open the valve 24 and permit fluid pressure to pass therethrough at a predetermined rate of increase, which rate of increase has been predetermined to govern the rate of forming a mass of resinous material placed between the die halves 25 and 26. As previously mentioned, the rate at which a mass of resinous material can be formed to produce an optical article of high perfection must be accurately controlled to prevent the development of optical strain in the article. The rate at which the article is formed is governed also by the temperature of the article during the forming process. The rate of forming and the temperature at which the article is held during the forming is coordinated to produce a formed article which will be substantially free of optical strain. To accomplish the given rate of formation the contour of the cam track 53 must be predesigned in order to open the valve 24 at the proper rate to permit passage of fluid pressure to the diaphragm motor 18 at the proper rate.

The pressure regulating valve 24 consists of a casing 80 within which there is secured a plunger valve 81 which controls the passage of air pressure from the supply line 21 to the conduit 20 which interconnects the valve 24 with the diaphragm motor 18. The plunger valve 81 has a lower body portion 82 and an upper body portion 83 which are secured together by means of the screws 84. The lower body portion 82 has a horizontal bore 85 which extends partly through the body portion 82 and communicates with a vertical bore 86. The vertical bore 86 communicates with a vertical bore 87 provided in the upper body portion 83. These bores 85, 86 and 87 provide the inlet passage communicating with the pressure conduit 21. A similar horizontal bore 89 is provided in the lower valve body portion 82 which extends partially through the body and communicates with a vertical bore 90. The vertical bore communicates with a vertical bore 91 provided in the upper body portion 83. The bores 89, 90 and 91 provide the discharge passage from the valve 81 connecting with the discharge conduit 20.

A bore 92 extends horizontally through the upper body portion 83 and forms the cylinder within which a plunger or piston 93 is adapted to reciprocate. The plunger 93 has an end portion 94 which fits the bore 92, which end portion 94 is separated from an annular collar portion 95 by means of an annular undercut portion 96. The annular collar portion 95 is separated from an end portion 97 by means of an annular undercut portion 98. The portions 94, 95 and 97 are of equal diameter for engaging the bore 92 in a piston-like relation. A leaf spring 99 urges the plunger 93 in a left-ward direction, as viewed in Figures 4, 5 and 6.

A mechanism for actuating the plunger 93 in response to the pressure within the diaphragm motor 18 consists of a Sylphon bellows 100 which has one end thereof secured to a stationary mounting member 101, which member is secured to the casing 80 by means of the screws or bolts 102. The opposite end of the Sylphon 100 is engaged by a compression spring 103 which has one end thereof in engagement with the closure member 104 of the Sylphon, and the opposite end thereof in engagement with an adjusting collar 105. The collar 105 is threaded upon a stationarily mounted stud 106 for altering the degree of compression of the spring 103. A conduit 107 is secured to the mounting 101 and communicates with the interior of the Sylphon 100. The opposite end of the conduit 107 communicates with the discharge conduit 20 from the valve member 81 and thus conducts the pressure from the discharge conduit 20 to within the Sylphon 100.

The Sylphon bellows 100 actuates the plunger 93 through means of a lever arm 108, which is loosely carried upon a pin 108a secured to the end portion 104 of the Sylphon bellows. The pin 108a thus becomes a pivot for the loosely mounted lever arm 108. The opposite end of the lever arm 108 engages a lever arm 109 and is connected thereto by means of the pivot pin 110. The lever arm 109 has an extending ear 111 to which there is connected one end of the tension spring 112, the opposite end of the tension spring being secured to the pin 113 fastened in the body of the casing 80.

The plunger 93 has a stem portion 114 which extends into engagement with a cup member 115 fastened upon the lever arm 108, whereby movement of the lever arm 108 actuates the plunger 93 through the stem portion 114.

In addition to the Sylphon bellows actuating the plunger 93 a mechanism interconnects the plunger 93 with the time controlled actuating cam 53 and consists of the actuating arm 52, one end of which engages the cam track 53 provided in the cam disk 53a. The opposite end of the actuating arm 52 is connected to a lever 116 by means of a pivot pin 117. The lever arm 116 is pivotally carried upon a wall of the casing 89 by means of the pivot pin 118. The arm 116 engages the arm 109 through means of an actuating pin 119, which pin is adjustably carried upon the arm 116 for longitudinal adjustment thereupon to vary the leverage between the arm 116 and the arm 109.

The regulating valve 24 just described provides a very accurate control mechanism for regulating the pressure applied to the diaphragm motor 18. When the cam disk 53a is driven by the timing motor 54, the actuating arm 52 will be moved in a rightward direction, as viewed in Figure 3, whereby the arm 116 will be pivoted about the pivot point 118 to permit the lever arm 108 to be moved in a rightward direction about the fulcrum pin 108a by means of the spring 112. This movement is accomplished through the pivot pin 110 which interconnects the lever 109 with the lever arm 108. Movement of the lever arm 109 by means of the actuating arm 52 permits a corresponding movement of the lever arm 108. When the lever arm 108 is moved in a rightward direction, as viewed in Figure 3, the plunger extension 114 actuates the plunger 93 in a rightward direction whereby the collar 95 opens the bore 87 to the annular space 98 around the plunger 93, and thus air pressure from the conduit 21 can pass from the bore 87 to the bore 91 to the conduit 20. Pressure in the conduit 20 will then be present in the conduit 107 to apply pressure to the Sylphon bellows 100. According to the compression of the spring 103 the bellows 100 will be moved in a leftward direction to move the end wall 104 thereof and thus the pin 108a. Movement of the pin 108a in a leftward direction permits the arm 108 to move in a leftward direction as fulcrumed about the pivot pin 110 whereby the plunger 93 is moved in a leftward direction by means of the leaf spring 99 to close the bore 87 from communication with the bore 91. The collar 95 on the plunger 93 is at this time between the bores 87 and 91.

If the pressure increase in the conduit 20 has been just sufficient to be balanced by the compression spring 103 the previous result will be obtained. However, if the pressure in the conduit 20 should exceed the compression force of the spring 103 the bellows 100 will expand in a leftward direction until the increased pressure is balanced against the compression force of the spring, under which condition the lever arm 108 may have permitted sufficient movement of the plunger 93 in a leftward direction that the portion 97 of the plunger leaves the bore 92. Such a position is indicated in Figure 6. In this position the bore 91 is open to the atmosphere through the port 120 provided by removal of the plunger portion 97 from the bore 92. Air can then escape from the conduit 20 through the bores 90 and 91 and the port 120 to the atmosphere and the pressure in the Sylphon bellows 100 is reduced to a point balanced by the spring 103 that the plunger portion will again re-enter the bore 92, and close the port 120.

It may thus be seen from the foregoing description that when the actuating arm 52 moves the actuating pin 119 in a rightward direction that the pivot 110 is permitted to move in a rightward direction whereby the plunger 114 is moved rightwardly. To offset the change in position of the pivot 110, the pivot pin 108a must be moved in a leftward direction. Fluid pressure is admitted to the Sylphon bellows 100 through the valve 81 until the pivot pin 108a moves leftward sufficiently to permit the annular collar 95 on the piston 93 to close the ports 87. The spring 103 determines the degree of pressure increase which has occurred. The lever system thus provides a mechanism whereby the movement of the actuating arm 52 is greatly reduced when transmitted to the piston 93 so that in effect the piston 93 is moved with a micrometer adjustment and thereby providing a very accurate pressure regulating controlling member for regulating the pressure to the Sylphon 100.

As previously described, the cam track 53 in the disk 53a has a predetermined contour for gradually moving the actuating arm 52 in a rightward direction, as viewed in Figure 3, whereby an increasing pressure is required in the bellows 100 to offset the increased opening attempted to be made by the cam disk 53a. This increase in pressure actuates the diaphragm motor 18 to operate the forming press. Since the contour of the cam track 53 is predetermined to produce a predetermined rate of pressure increase over a predetermined time interval, it can readily be seen that the regulating valve 24 provides a very accurate control over the pressure applied to the diaphragm motor 18.

A microlimit switch 55 is positioned adjacent the platens 10 and 12 and is adapted to be operated by an arm 56 extending from the movable platen 12. The microlimit switch 55, which is shown diagrammatically in Figure 1, consists of a leaf spring 57 which is rigidly mounted at one end thereof, as indicated at 58. The center portion of the leaf spring 57 is formed arcuately and is so arranged that when pressure is applied to the arcuate portion thereof the spring 57 will snap over center in the manner of the well known cricket spring. The free end of the leaf spring 57 carries a contact 59 which is adapted to engage a contact 60 when in one position or a contact 61 when in the opposite position. The device for operating the leaf spring 57 consists of a cup member 62 within which there is mounted a piston 63 carrying an extending rod 64, the piston 63 being slidable within the cup shaped member 62. A spring 65 is positioned between the piston 63 and the cup shaped member 62. The cup shaped member 62 is so positioned with respect to the press platen 12 that the arm 56 can engage the cupped member 62 for moving the rod 64 into engagement with the arcuate portion of the leaf spring 57.

The microlimit switch 55 is adjustably positioned with respect to the platens 10 and 12 to permit the spaced relationship of the platens to be varied before the limit switch becomes effective. Since the limit switch is operated by a very slight movement, the switch becomes a means for accurately controlling the spaced relationship of the die halves 25 and 26, and thus determines the thickness of a lens formed therebetween.

The limit switch 55 controls concomitant operation of the timing motor 54 and the solenoid 46. An electric circuit is established for the timing motor 54 through the lines 66, 67 and 68, the contacts 60 and 59 and the line 69. At the same time an electric circuit is established for the solenoid valve 46 by means of the lines 70, 71, the contacts 60 and 59 and the line 69. It may thus be seen that the solenoid valve 46 is energized concomitantly with energization of the timing motor 54 when the limit switch 55 is in the position with the contacts 59 and 60 closed. A hand switch 72 is provided in the electric circuit for the timing motor 54.

When the limit switch 55 is in position with the contacts 59 and 61 closed electric circuit is established for the solenoid valve 49 through the lines 73, 74 and 69, the circuit at this time being broken through the solenoid valve 46 and the timing motor 54.

The cycle of operation for the press when forming an optical article from a mass of resinous material, and particularly when forming lenses of a high degree of perfection is as follows. When starting a cycle of operation the press and the operating mechanism is as shown in Figure 1. At this time the solenoid valve 46 is open so that pressure from the fluid storage reservoir 19 is applied to the diaphragm motors 41 and 42, whereby the valves 39 and 40 are open. Steam from the boiler 31 is circulating through the conduits 33, 34 and 35 to the platens 10 and 12 respectively, the steam pressure is present in the conduits 37, 38 and 36, thus completing the steam circuit through the platens. The presence of steam pressure in the conduit 36 closes the check valve 59 to prevent cooling fluid from entering the conduit 36, it being understood for this purpose that the steam pressure in the conduit 36 is above the pressure of the cooling fluid in the conduit 50. The check valve 51 being of an ordinary swing type is closed by the differential of pressure on the two sides thereof.

The platens 10 and 12 are thus being heated as well as the die halves 25 and 26. It will be understood that at this time the manual control valve 22 has been turned to open the exhaust conduit 23 so that no pressure is existing in the diaphragm motor 18 whereby the die halves 25 and 26 are permitted to remain in the open position as shown in Figure 1.

Sufficient heating time is given the die halves 25 and 26 to bring them up to a desirable temperature after which a mass of resinous material is positioned upon the die half 26. If an ophthalmic lens is to be formed the mass of resinous material can be in the form of a disk of suitable thickness, which can either be a flat disk or can be preformed to a slight extent with substantially the surface curvature of the die halves 25 and 26.

The cam 53 on the timing motor 54 is set manually so that the actuating arm 52 of the valve 24 will close the valve 24. The valve 22 may now be operated to close the exhaust conduit 23 and to open the through connection in the conduit 20 thereby establishing communication between the valve 24 and the diaphragm motor 18. The hand switch 72 is now closed whereupon the timing motor 54 is started. Initial rotation of the cam opens the valve 24 slightly whereupon pressure from the fluid pressure reservoir 19 is conducted to the diaphragm motor 18. It will be understood, however, that at this time the pressure in the conduit 20 and the diaphragm motor 18 is just sufficient to close the die half 26 against the die half 25 and to place a very slight pressure upon the lens blank positioned therebetween. This initial pressure is retained within the diaphragm motor for a predetermined interval of time, the time interval being determined by the rotation of the cam 53, the contour of the face of the cam being shaped in such a manner that the initial position of the valve 24 is retained for whatever determined period of time desired. During this period steam is circulating through the platens 10 and 12 whereby the lens blank, positioned between the die halves 25 and 26, is brought to a desirable molding or forming temperature.

After rotation of the cam through the predetermined interval of time, as determined by the timing motor 54, the contour of the cam 53 will then effect a gradual increase in the opening of the valve 24, whereby the pressure in the conduit 20 and the diaphragm motor 18 will gradually increase. The increasing pressure within the diaphragm motor 18 will cause the die half 26 to move toward the die half 25 and thereby form the lens blank positioned therebetween to the configuration of the face surfaces 29 and 30 of the respective die halves. As previously mentioned the rate of this formation is determined by the contour of the cam 53 since the contour of this cam determines the rate of opening of the valve 24 and thus the rate of pressure increase in the diaphragm motor 18.

Upon the die halves 25 and 26 reaching a predetermined spaced relationship, which spaced relationship determines the thickness of the lens formed therebetween, the arm 56 will engage the microlimit switch 55 to cause the leaf spring 57 to snap over center and break engagement with the contact 60 and make contact with contact 61.

When electric circuit is broken through contacts 59 and 60 the timing motor 54 and the solenoid valve 46 are deenergized, whereby the pressure in the diaphragm motor 18 is prevented from further increase since the valve 24 will not be open any further and will hold the pressure at this point. The solenoid valve 46 will close the through passage from the conduit 45 and will open an exhaust passage 47 whereby the pressure in the diaphragm motors 41 and 42 will be released to the atmosphere, thereby closing the valves 39 and 40.

At the instant electric circuit was broken through contacts 59 and 60, electric circuit was made between contacts 59 and 61 whereby the valve 49 was energized to open the exhaust conduit 48. When the exhaust conduit 48 is opened steam pressure existing in the conduits 33, 34, 35, 36, 37 and 38 is exhausted to the atmosphere. This release of pressure in these conduits, and particularly in conduit 36, permits the pressure of the cooling fluid in the conduit 50 to open the check valve 51 and pass therethrough into the conduit 36. The cooling fluid will then pass from the conduit 36 to the conduits 37 and 38 into the platens 10 and 12 respectively, and will discharge therefrom through the conduits 34 and 35 and the exhaust conduit 48.

The circulation of cooling fluid in this circuit is maintained until the valve 22 is manually operated to establish connection between the diaphragm motor 18 and the exhaust 23, whereupon pressure is released from the diaphragm motor to permit separation of the platen 12 from the platen 10. It will be understood that the cooling portion of the cycle of operation of the press is determined according to the experience of an operator who will know when it is time to open the die halves 25 and 26 for removal of a lens formed therein.

When the platen 12 separates from the platen 10, the leaf spring 57, of the microlimit switch 55, will snap to its normal position, as indicated in Figure 1, to reestablish electric circuit between the contacts 50 and 60. Reestablishment of this electric circuit again opens the solenoid valve 46 which in turn permits pressure to be applied to the diaphragm motors 41 and 42 to reopen the valves 39 and 40. Breaking of electric circuit between contacts 59 and 61 deenergized the solenoid 49 to close the exhaust conduit 48. The heating circuit is thus reestablished to the platens 10 and 12, the pressure then building up in the conduit 36 to close the check valve 51 and prevent the cooling fluid from entering the conduit 36.

At the time the manually operated valve 22 is opened the hand switch 72 is also opened so that the timing motor 54 is now inoperative for further actuation of the valve 24. The press is now in condition for the beginning of the next cycle of operation which can be repeated as previously described.

While the form and embodiment herein described is a preferred form, yet it will be understood that I desire to comprehend within the scope of my invention all modifications falling within the purview of my invention.

Having thus fully described my invention, what I claim as new and desire to secure by Letters Patent is:

1. An apparatus for controlling the flow of pressure fluid to a forming press comprising pressure regulating valve means for opening and closing a fluid conducting conduit, means actuated by the fluid pressure on the discharge side of said valve for closing said valve, means for urging the said actuated means toward valve closing position, and means opposing said last mentioned means actuated by a time controlled mechanism for gradually opening said valve to increase the fluid pressure on the discharge side of said valve before the pressure actuated means can respond to close said valve.

2. An apparatus for controlling the flow of pressure fluid to a forming press comprising pressure regulating valve means for opening and closing a fluid conducting conduit, means actuated by the fluid pressure on the discharge side of said valve means for urging the same toward closed position, means opposing said last mentioned means actuated by a time controlled mechanism for gradually opening said valve, and resilient means opposing said pressure actuated means to adjust the operating pressure of said latter means.

3. A pressure regulating valve comprising a piston valve, an inlet port and outlet ports for said valve, the piston of said valve comprising an annular recess communicatable with said inlet port, a second annular recess communicatable with said outlet ports and an annular shoulder between said recesses, expansible means for receiving pressure fluid discharged from said valve, resilient means opposing movement of said expansible means, a lever having one end pivotally associated with said expansible means, means for actuating the free end of said lever, and means interconnecting said piston valve with said lever at a point intermediate the pivot connection and the free end thereof.

4. A pressure regulating device for controlling the flow of pressure fluid to a forming press which includes, pressure actuated means, lever means having one end thereof engaged by said pressure actuated means, mechanically actuated means engaging the opposite end of said lever means for movement thereof, whereby said lever means floats between said pressure actuated means and said mechanically actuated means, valve means including a body having a piston plunger therein that extends from said body into engagement with said lever means, inlet and discharge port means in said body for conducting pressure fluid to and from said body, annular recesses in said piston plunger for interconnecting said port means to conduct pressure fluid through said body and for connecting the discharge port means in said body with an exhaust, conduit means connecting the discharge port means in said body with said pressure actuated means for thereby moving said lever means to move said valve means to close the inlet port upon an increase in pressure on the discharge side of said valve means, said mechanically actuated means opposing movement of said lever means by said pressure actuated means to thereby urge said valve means to the open position, whereby said pressure actuated means and said mechanically actuated means produce a balance for establishing a predetermined pressure on the discharge side of said valve means.

5. A pressure regulating device for controlling flow of pressure fluid to a forming press which includes, pressure actuated means, lever means engaging said pressure actuated means for movement thereby, mechanically actuated means engaging said lever means for opposing the movement of said lever by said pressure actuated means; valve means actuated by said lever means including a body, piston valve means slidable within said body having one end thereof extending from said body, inlet and discharge port means in said body for establishing a fluid flow passage through said body which includes the cylinder for said piston means, said piston valve means having annular recesses therein for interconnecting said port means through the cylinder of said piston valve means and for connecting the discharge port with an exhaust through the cylinder for said piston valve means; and conduit means connecting the discharge port in said body with said pressure actuated means, whereby said valve means is actuated to produce a predetermined pressure in the discharge port.

6. An apparatus for controlling the flow of pressure fluid to a forming press comprising pressure regulating valve means constructed and arranged to pass pressure fluid from the inlet to the outlet side thereof and to exhaust pressure fluid from the outlet side thereof, means actuated by the fluid pressure on the discharge side of said valve means for urging the same toward closed position, and means opposing said last mentioned means actuated by a time controlled mechanism for gradually opening said valve to increase the fluid pressure on the discharge side of said valve before the pressure actuated means can respond to close said valve, said pressure actuated means also actuating said valve to relieve pressure from the discharge side of said valve when the pressure fluid added to the discharge side of said valve overbalances the opening of said valve by said time controlled mechanism.

7. A pressure regulating device for controlling flow of pressure fluid to a forming press comprising valve means adapted to be inserted in the pressure conduit connecting the forming press to a source of pressure, said valve means including a body having a piston plunger therein controlling inlet port means discharge port means and exhaust port means in said body to regulate the flow of pressure fluid passing through said body, said plunger having an annular recess to interconnect said inlet port with said discharge port and said discharge port with said exhaust selectively to open and close the same, lever means having both ends movably carried engaged by said plunger means which is actuated thereby, means actuated by pressure fluid discharged from said discharge port means operably connected to one end of said lever for moving said plunger means in one direction of movement, and means movable in opposition to said last mentioned means operably connected to the opposite end of said lever to move the same and thereby cause a movement of said plunger means which is the resultant of the movement of both ends of said lever means.

8. A pressure regulating device for controlling flow of pressure fluid to a forming press compresing valve means adapted to be inserted in the pressure conduit connecting the forming press to a source of pressure, said valve means including a body having a piston plunger therein controlling inlet port means discharge port means and exhaust port means in said body to regulate the flow of pressure fluid passing through said body, said plunger having an annular recess to interconnect said inlet port with said discharge port and said discharge port with said exhaust selectively to open and close the same, lever means having both ends movably carried engaged by said plunger means which is actuated thereby, means actuated by pressure fluid discharged from said discharge port means operably connected to one end of said lever for moving said plunger means in one direction of movement, and means movable constantly in at least one direction of movement for a predetermined distance of movement in opposition to said last mentioned means operably connected to the opposite end of said lever to move the same continuously in the said one direction of movement and thereby cause a continuous movement of said plunger means in the said one direction which is the resultant of the movement of both ends of said lever means to cause a gradual pressure change in said discharge port.

CHARLES V. SMITH.